United States Patent
An et al.

(10) Patent No.: US 10,104,366 B2
(45) Date of Patent: Oct. 16, 2018

(54) STEREOPSIS IMAGE DISPLAY DEVICE AND METHOD FOR DRIVING THE SAME

(71) Applicant: LG Display Co., Ltd., Seoul (KR)

(72) Inventors: Chung Hwan An, Seoul (KR); Jae Woo Lee, Gyeonggi-do (KR); Chang Ho Lee, Gyeonggi-do (KR); Bo Gyun Chung, Gyeonggi-do (KR); Yoon Sung Tak, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/578,749

(22) Filed: Dec. 22, 2014

(65) Prior Publication Data

US 2015/0189259 A1 Jul. 2, 2015

(30) Foreign Application Priority Data

Dec. 31, 2013 (KR) .................. 10-2013-0169453

(51) Int. Cl.
  *G09G 5/02* (2006.01)
  *H04N 13/305* (2018.01)
  (Continued)

(52) U.S. Cl.
  CPC ........... *H04N 13/305* (2018.05); *G09G 3/003* (2013.01); *H04N 13/0404* (2013.01);
  (Continued)

(58) Field of Classification Search
  CPC ............... H04N 13/00; H04N 13/0003; H04N 13/0007; H04N 13/0011; H04N 13/0014;
  (Continued)

(56) References Cited

U.S. PATENT DOCUMENTS 7,864,422 B2 * 1/2011 Jung .................. H04N 13/0454
  348/59
8,952,942 B2 2/2015 Chae
  (Continued)

FOREIGN PATENT DOCUMENTS

CN 102340683 A 2/2012
CN 103018996 A 4/2013
  (Continued)

OTHER PUBLICATIONS

English Language Machine Translation of JP-2004-325494A.*
Chinese Office Action dated Jun. 7, 2016 for corresponding Chinese patent application No. 201410858314.5.

*Primary Examiner* — Jason Mandeville
(74) *Attorney, Agent, or Firm* — Morgan, Lewis & Bockius LLP

(57) ABSTRACT

A stereopsis image display device is provided that prevents 3D crosstalk from being generated and enables a lenticular film to be freely bent. The stereopsis image display device comprises a plurality of data lines arranged in a first direction; a plurality of gate lines arranged in a second direction; a plurality of sub pixels defined by crossing between the plurality of gate lines and the plurality of data lines; and a lenticular film provided on the plurality of sub pixels, wherein the plurality of sub pixels are provided in a horizontal 2-domain structure.

20 Claims, 15 Drawing Sheets

(51) Int. Cl.
  *H04N 13/04* (2006.01)
  *G09G 3/00* (2006.01)
  *H04N 13/324* (2018.01)
  *H04N 13/356* (2018.01)
(52) U.S. Cl.
  CPC ..... *H04N 13/0422* (2013.01); *H04N 13/0452* (2013.01); *H04N 13/324* (2018.05); *H04N 13/356* (2018.05); *H04N 13/0415* (2013.01)
(58) Field of Classification Search
  CPC ............... H04N 13/04; H04N 13/0402; H04N 13/0404; H04N 13/0406; H04N 13/0452; H04N 13/0468; H04N 13/0484; H04N 13/305; H04N 13/356; H04N 13/324; H04N 13/0415; H04N 13/0422; G09G 3/003
  See application file for complete search history.

(56) References Cited

U.S. PATENT DOCUMENTS

| | | | | |
|---|---|---|---|---|
| 9,124,884 | B2* | 9/2015 | Kim | H04N 13/0438 |
| 2005/0104801 | A1* | 5/2005 | Sugiura | H01L 27/12 345/5 |
| 2009/0278936 | A1* | 11/2009 | Pastoor | G09G 3/003 348/169 |
| 2009/0282429 | A1* | 11/2009 | Olsson | H04N 13/0477 725/10 |
| 2010/0265284 | A1* | 10/2010 | Satou | G09G 3/003 345/697 |
| 2011/0221747 | A1* | 9/2011 | Kim | H04N 13/0438 345/419 |
| 2012/0013656 | A1 | 1/2012 | Chae | |
| 2012/0105496 | A1* | 5/2012 | Komiya | G09G 3/003 345/690 |
| 2012/0146994 | A1* | 6/2012 | Jeong | H04N 13/0497 345/419 |
| 2012/0169949 | A1* | 7/2012 | Son | G02B 6/0056 349/15 |
| 2012/0218258 | A1* | 8/2012 | Mashitani | H04N 13/0413 345/419 |
| 2013/0063332 | A1* | 3/2013 | Inoue | G02B 27/2214 345/102 |
| 2013/0088532 | A1* | 4/2013 | Shin | H04N 13/0404 345/691 |
| 2013/0128019 | A1* | 5/2013 | Tajima | G02B 27/2214 348/59 |
| 2013/0135293 | A1* | 5/2013 | Kim | G09G 3/003 345/419 |
| 2014/0043323 | A1* | 2/2014 | Sumi | G02B 27/22 345/419 |
| 2014/0146149 | A1 | 5/2014 | Wu | |
| 2014/0347409 | A1* | 11/2014 | Lv | H04N 13/31 345/694 |

FOREIGN PATENT DOCUMENTS

| | | |
|---|---|---|
| CN | 202975533 U | 6/2013 |
| JP | 2004325494 A | * 11/2004 |

* cited by examiner

< 2D driving >

< 2view 3D display >

< Full resolution cognition > tracking in a unit of 1/2 view
change of input position of black data from first domain to second domain < Full resolution cognition > tracking in a unit of 1/2 view
change of input position of black data from first domain to second domain FIG. 16
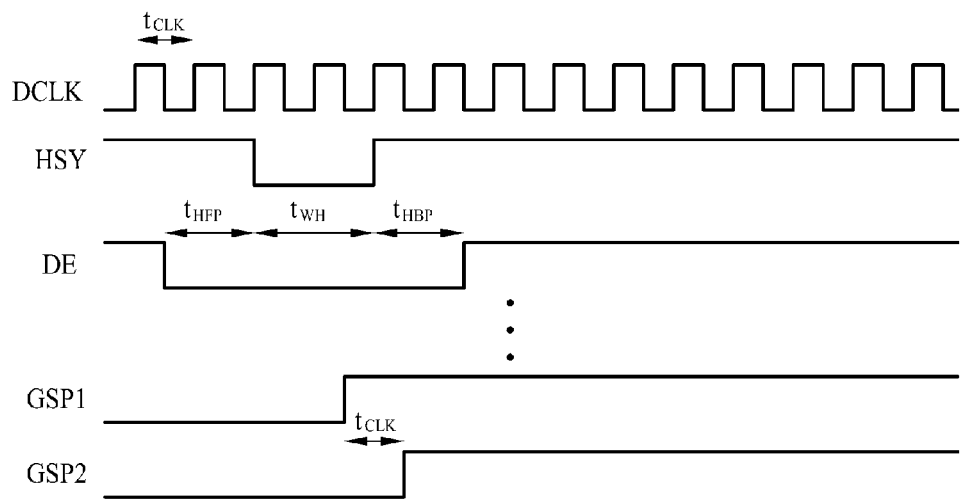
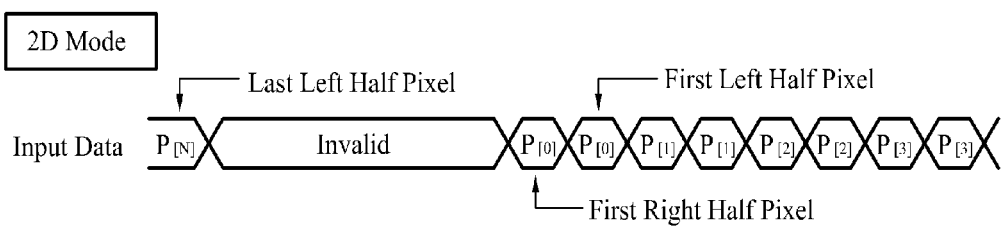
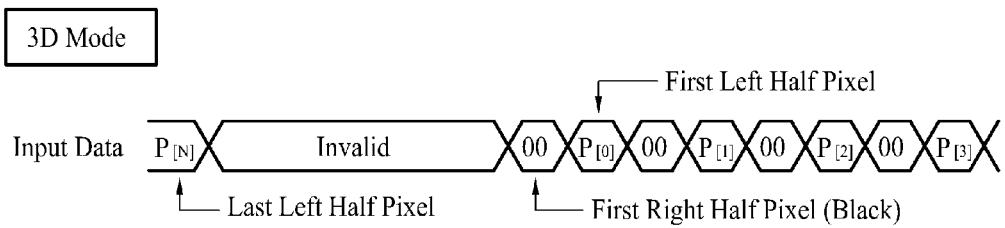

< 3D mode >

< 2D mode >

< 3D mode >

STEREOPSIS IMAGE DISPLAY DEVICE AND METHOD FOR DRIVING THE SAME

CROSS REFERENCE TO RELATED APPLICATIONS

This application claims the benefit of Korean Patent Application No. 10-2013-0169453 filed on Dec. 31, 2013, which is hereby incorporated by reference for all purposes as if fully set forth herein.

BACKGROUND OF THE INVENTION

Field of the Invention

The present invention relates to a image display device and a method for driving the same, and more particularly to a stereopsis (stereoscopic) image display device and a method for driving the same.

Discussion of the Related Art

As realistic images are becoming more in demand, stereopsis (stereoscopic) image display devices that display 3D images as well as 2D images are being developed.

2D-image display devices have been greatly advanced in terms of a quality of a display image such as resolution and viewing angle, but have a limitation in that 2D-image display devices cannot display depth information of an image because they are displaying 2D images.

On the other hand, 3D-image display devices display 3D stereopsis images instead of 2D-planar images, and thus fully transfer original 3D information to a user. Therefore, in comparison with the existing 2D-image display devices, 3D-image display devices display far more vivid and realistic stereopsis images.

3D-image display devices are largely categorized into 3D-glasses display devices using 3D special glasses and glasses-free 3D-display devices using no 3D special glasses. The glasses-free 3D display devices are the same as 3D-special-glasses display devices in the sense that the glasses-free 3D display devices provide a three-dimensionality of an image to a viewer by using a binocular disparity. However, since the glasses-free 3D display devices do not require wearing 3D glasses, the glasses-free 3D-display devices are differentiated from the 3D-special-glasses display devices.

FIG. 1 is a diagram illustrating a method of realizing a multi-view in a glasses-free stereopsis image display device according to the related art, and FIG. 2 is a diagram illustrating a glasses-free stereopsis image display device according to the related art.

With reference to FIGS. 1 and 2, the related art glasses-free stereopsis image display device display device includes a display panel 20, polarizing films 10 and 30 arranged blow and above the display panel 20, a gap glass 40 (or gap film), a barrier layer 50, and a polarizing film 60 and a lenticular film 70 formed on the barrier layer 50.

The related art glasses-free stereopsis image display device displays an image through a panel in which R, G, and B pixels are arranged in a matrix type, and arranges the barrier layer 50 and the lenticular film 70 on the display panel 20, thereby enabling a viewer to view a 3D image as a multi-view.

An image is divided and displayed by using N number of pixels in one pitch of a lenticular lens, thereby enabling the viewer to view a 3D image at N number of viewpoints. When the viewer is located at a predetermined view position, different images are projected onto left and right eyes of the viewer, and thus, the viewer feels three-dimensionality due to a binocular disparity.

In such lenticular 3D display devices, problems occur in that resolution of a 3D image is reduced in proportion to the number of multi-views, and if the number of views is increased, 3D crosstalk is increased and three-dimensionality of 3D image is reduced. That is, a 4-view type 3D display device has resolution of 3D image, which is lower than that of a 2-view type 3D display device.

In order to increase three-dimensionality of 3D image and reduce 3D crosstalk, the related art glasses-free 3D display device is provided with the barrier layer 50, a plurality of polarizing films and the lenticular lens 70. However, problems occur in that the 3D display device becomes thick and its manufacturing cost is increased.

FIG. 3 is a diagram illustrating pixel arrangement of a glasses-free stereopsis image display device according to the related art.

With reference to FIG. 3, when an eye tracking technique is applied to a pixel arrangement structure according to the related art, images may be controlled basically in a unit of 1 view in case of a fixed barrier or switch barrier. Accordingly, if the eye tracking technique is used, problems occur in that it is difficult to detect a position of a viewer and there is a big change in tracking.

Meanwhile, if a moving barrier technique is applied to the pixel arrangement structure according to the related art, it is required that a barrier electrode should be divided minutely. Accordingly, if the moving barrier technique is applied to the pixel arrangement structure according to the related art, a problem occurs in that the frequency of horizontal electric field is increased, whereby 3D crosstalk is increased.

Also, a problem occurs in that bending of the lenticular film 70 is not freely performed and abundant depth of 3D image cannot be provided, whereby realistic 3D image cannot be realized in comparison with the glasses display device.

SUMMARY OF THE INVENTION

Accordingly, the present invention is directed to a stereopsis image display device and a method for driving the same, which substantially obviate one or more problems due to limitations and disadvantages of the related art.

An object of the present invention is to provide a stereopsis image display device and a method for driving the same, in which display quality of 3D images may be increased.

Another object of the present invention is to provide a stereopsis image display device and a method for driving the same, in which 3D crosstalk may be prevented from being generated.

Still another object of the present invention is to provide a stereopsis image display device and a method for driving the same, in which luminance of 3D images may be increased.

Further still another object of the present invention is to provide a stereopsis image display device that may reduce its manufacturing cost and thickness by omitting a gap glass or gap film used at a proper viewing distance of 3D images.

Further still another object of the present invention is to provide a stereopsis image display device that may freely bend a lenticular film.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a stereopsis image display device comprises a plurality of data lines arranged in a first direction; a plurality of gate lines arranged in a second direction; a plurality of sub pixels defined by crossing between the plurality of gate lines and the plurality of data lines; and a lenticular film provided on the plurality of sub pixels, wherein the plurality of sub pixels are provided in a horizontal 2-domain structure.

In another aspect, a method for driving a stereopsis image display device comprises displaying images by inputting R, G and B image data to a first domain of horizontal two domains provided in sub pixels; and displaying black by inputting black data to a second domain.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 16 is a diagram illustrating input data for driving of a 2D mode and a 3D mode;

DETAILED DESCRIPTION OF THE ILLUSTRATED EMBODIMENTS

Reference will now be made in detail to the exemplary embodiments of the present invention, examples of which are illustrated in the accompanying drawings. Wherever possible, the same reference numbers will be used throughout the drawings to refer to the same or like parts.

The present invention relates to a stereopsis (stereoscopic) image display device that displays 3D images as a multi-view by using a lenticular film, and a method for driving the same. The present invention reduces thickness and manufacturing cost of a glasses-free stereopsis image display device, and prevents 3D crosstalk from being generated, thereby increasing display quality of 3D images.

Hereinafter, a stereopsis image display device and a method for driving the same according to the embodiment of the present invention will be described with reference to the accompanying drawings.

Figure 1:
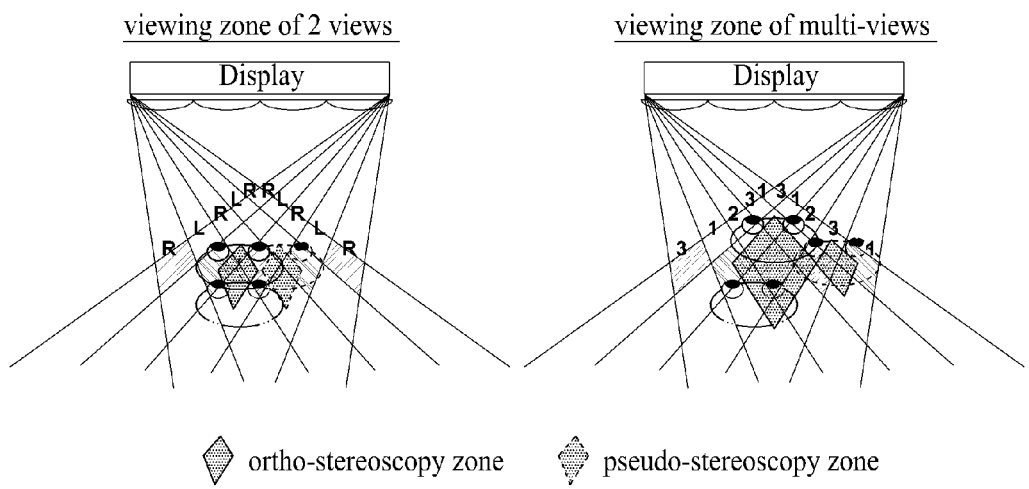
FIG. 1 is a diagram illustrating a method of realizing a multi-view in a glasses-free 3D display device according to the related art.
Figure 2:
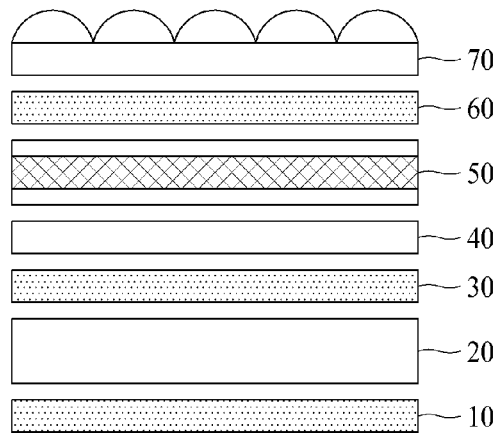
FIG. 2 is a diagram illustrating a glasses-free stereopsis image display device according to the related art.
Figure 3:
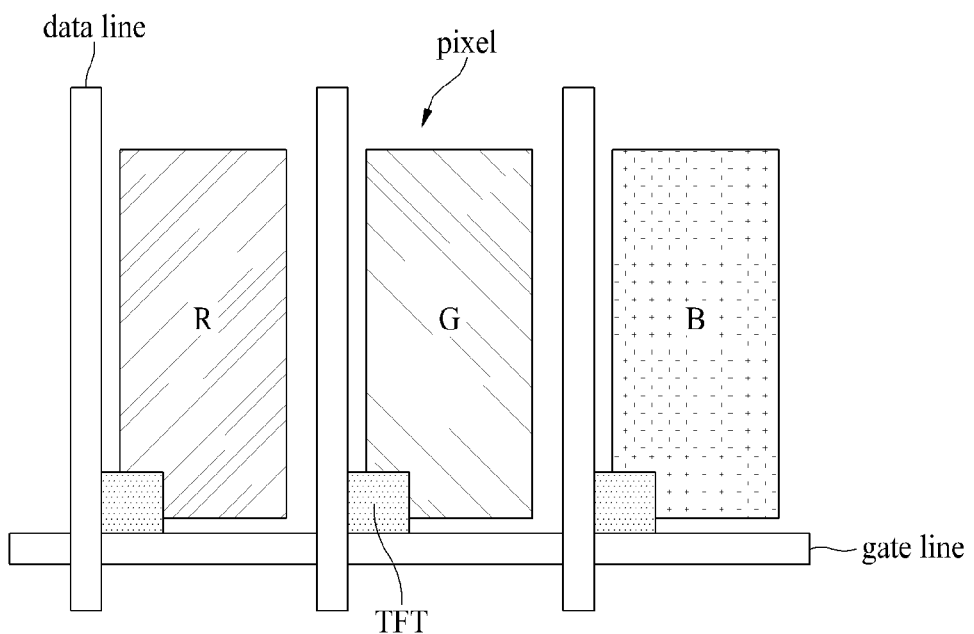
FIG. 3 is a diagram illustrating pixel arrangement of a glasses-free stereopsis image display device according to the related art.
Figure 4:
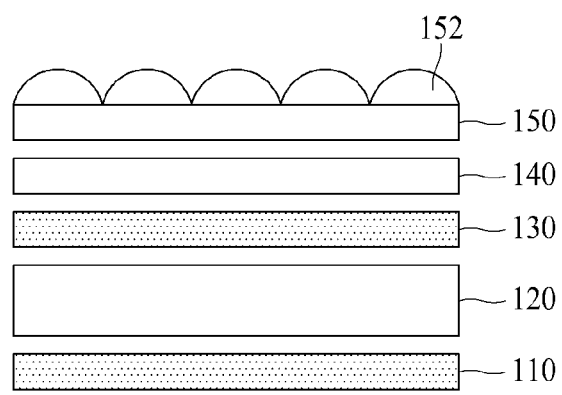
FIG. 4 is a diagram illustrating a stereopsis image display device according to the embodiment of the present invention.

FIG. 4 is a diagram illustrating a stereopsis image display device according to the embodiment of the present invention.

The stereopsis image display device according to the embodiment of the present invention includes a display panel 120, polarizing films 110 and 130 arranged blow and above the display panel 120, a gap glass 140 (or gap film), and a lenticular film 150 provided with a plurality of lenses 152.

In this case, a liquid crystal panel or an organic light emitting diode panel may be used as the display panel 120. The stereopsis image display device according to the embodiment of the present invention may selectively include or omit the gap glass 140 (or gap film) for controlling a viewing distance.

In the stereopsis image display device according to the embodiment of the present invention, the barrier layer and one polarizing film according to the related art have been omitted. Accordingly, the stereopsis image display device of which thickness is thin may be manufactured, and its manufacturing cost may be reduced.

Figure 5:
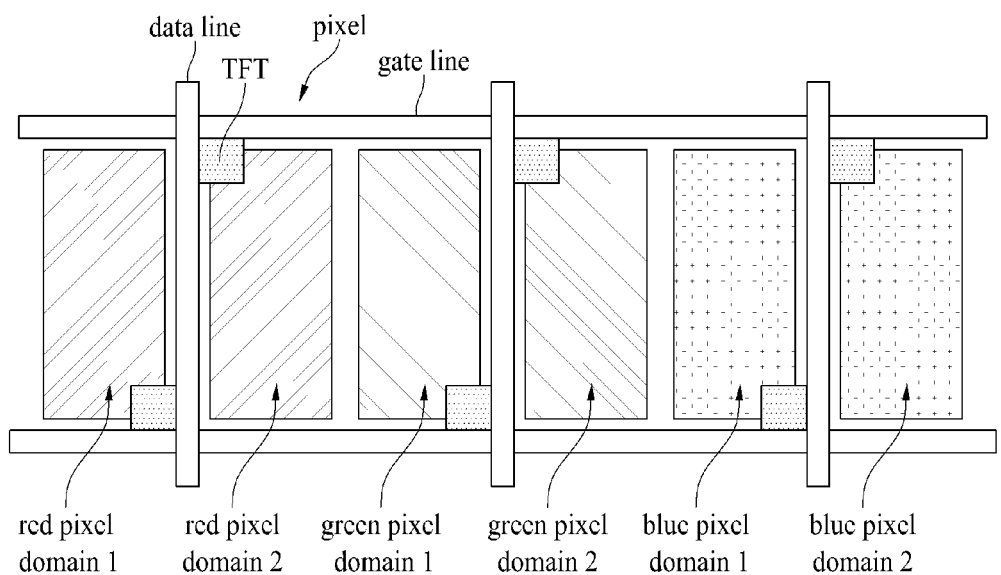
FIG. 5 is a diagram illustrating pixel arrangement of a stereopsis image display device according to the embodiment of the present invention.

FIG. 5 is a diagram illustrating pixel arrangement of a stereopsis image display device according to the embodiment of the present invention.

With reference to FIG. 5, in an arrangement structure of a pixel formed in the display panel, one pixel includes two sub pixels to have two domains.

The sub pixels of two neighboring domains share one data line. TFTs of two sub pixels are turned on by different gate lines. Namely, the first sub pixel and the second sub pixel share one data line, the TFT of the first sub pixel is turned on by a scan signal supplied from the first gate line, and the TFT of the second sub pixel is turned on a scan signal supplied from the second gate line.

Figure 6:
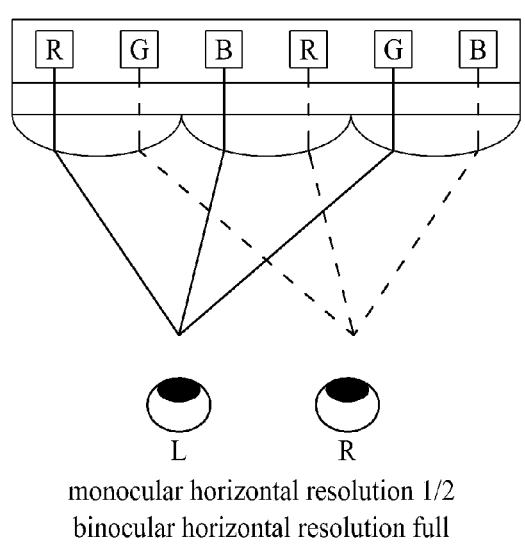
FIG. 6 is a diagram illustrating that 3D images are perceived through a stereopsis image display device according to the embodiment of the present invention.

FIG. 6 is a diagram illustrating that 3D images are perceived through a stereopsis image display device according to the embodiment of the present invention.

With reference to FIG. 6, the sub pixels of two domains are driven independently, whereby 3D images may be displayed. Monocular horizontal resolution (horizontal resolution of one side eye) during 3D viewing becomes ½, and binocular horizontal resolution becomes full resolution.

Figure 7:
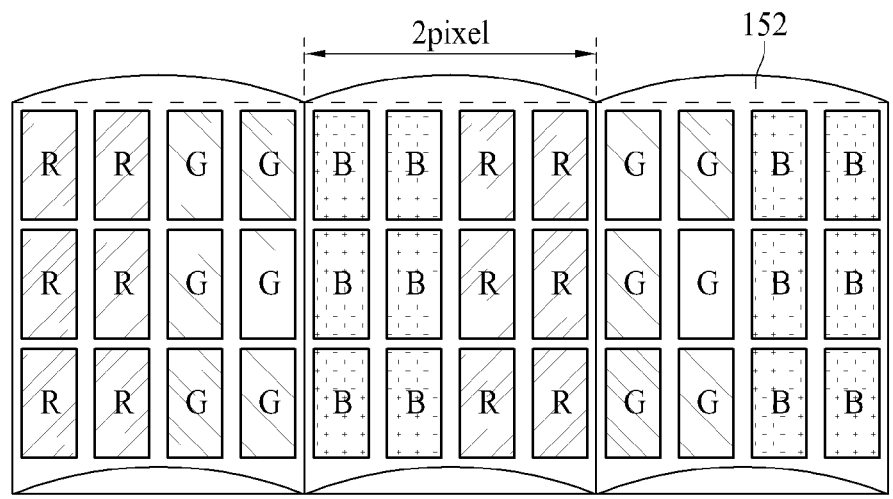
FIG. 7 is a diagram illustrating that 2D mode driving of a stereopsis image display device according to the embodiment of the present invention.
Figure 8:
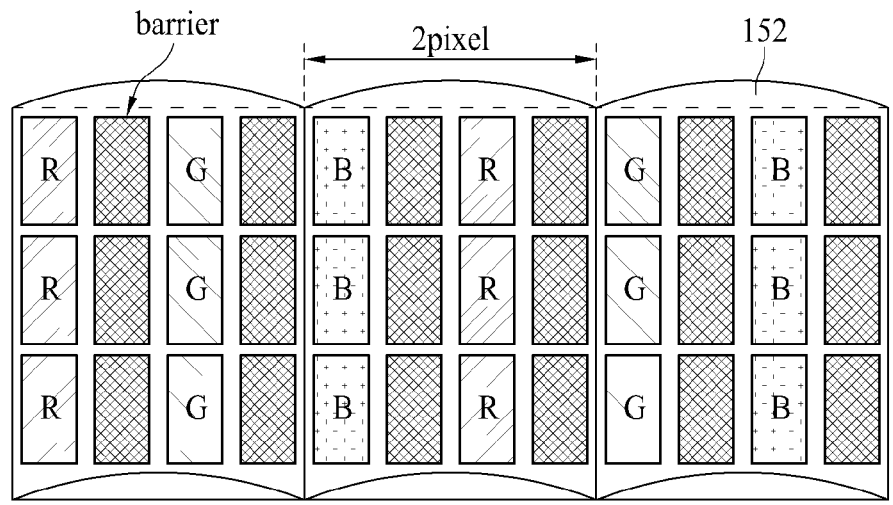
FIG. 8 is a diagram illustrating that 3D mode driving of a stereopsis image display device according to the embodiment of the present invention.

FIG. 7 is a diagram illustrating that 2D mode driving of a stereopsis image display device according to the embodiment of the present invention, and FIG. 8 is a diagram illustrating that 3D mode driving of a stereopsis image display device according to the embodiment of the present invention.

With reference to FIGS. 7 and 8, two domains are turned on in a 2D mode in the same manner as a general display.

On the other hand, one of the two domains is turned off and the other one is turned on in a 3D mode.

For example, of the two domains, the first domain formed at the left side is turned on while the second domain formed at the right side is turned off. Since the turned-off domain displays back image, the corresponding domain becomes a barrier. Since a half of the two domains is blacked, the viewer views all sub pixels. Accordingly, resolution of 2D image is equivalent to that of 3D image.

In this case, the lenses 152 of the fixed lenticular film formed on the display panel are based on 2 views of two sub pixels. The lenses 152 are formed in a double structure in a unit of two sub pixels (4 domains).

Left-eye image data or right-eye image data are input to every odd numbered sub pixel based on a horizontal line. The other data may be input to every even numbered sub pixel. For example, if left-eye image data are input to the respective odd numbered sub pixels, the right-eye image data are input to the respective even numbered sub pixels.

Figure 9:
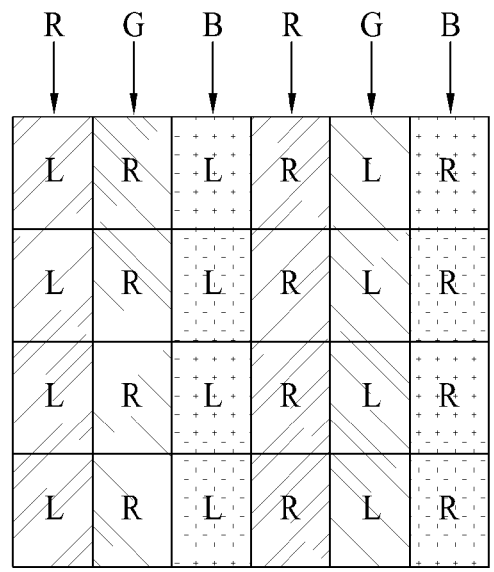
FIG. 9 is a diagram illustrating binocular cognitive images (left-eye image and right-eye image) and resolution during 2-view 3D mode driving of a stereopsis image display device according to the embodiment of the present invention.

FIG. 9 is a diagram illustrating binocular cognitive images (left-eye image and right-eye image) and resolution during 2-view 3D mode driving of a stereopsis image display device according to the embodiment of the present invention.

With reference to FIG. 9, the left-eye image and the right-eye image displayed on the display panel are refracted through the lenticular film, thereby forming a viewing zone. The viewer perceives 3D image by respectively receiving images corresponding to the left eye and the right eye. If 2-view 3D image is displayed on the display panel, the viewer may perceive full resolution.

A general barrier type glasses-free stereopsis image display device has an aperture ratio of 25% to 35% level. On the other hand, in the present invention, since one of two domains is blacked, an aperture ratio of about 50% may be formed. Accordingly, luminance may be increased as much as twice in comparison with the barrier type display device according to the related art. Also, in the present invention, luminance of about 25% may be improved in comparison with FPR glasses based 3D image display device.

Figure 10:
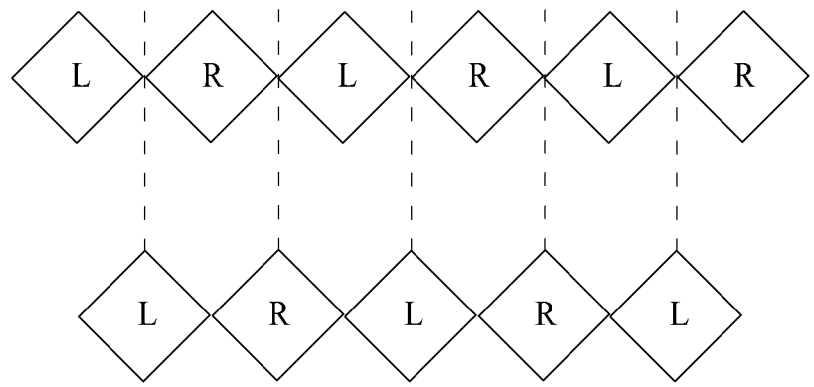
FIG. 10 is a diagram illustrating that a viewing zone is changed based on eye tracking in a 2-view 3D mode.

FIG. 10 is a diagram illustrating that a viewing zone is changed based on eye tracking in a 2-view 3D mode.

With reference to FIG. 10, if eye tracking is used, a domain blacked at one sub pixel and a domain for displaying image may be changed to each other, whereby tracking may be controlled in a unit of ½ view. As a result, in the present invention, image change occurs as much as ½ in comparison with the related art image, thereby enabling natural tracking. In other words, in the present invention, 4-view based tracking may be performed in a 2-view based structure, whereby tracking throughput is improved as much as twice in comparison with the related art.

Also, in the present invention, since the stereopsis image display device is formed based on 2 views, three-dimensionality of 3D image is improved to a level of FPR or shutter glass.

Also, in the present invention, 3D crosstalk may be reduced remarkably in comparison with a multi-view stereopsis image display device. Also, since one domain is blacked in a two-domain structure, 3D crosstalk may be reduced.

Figure 11:
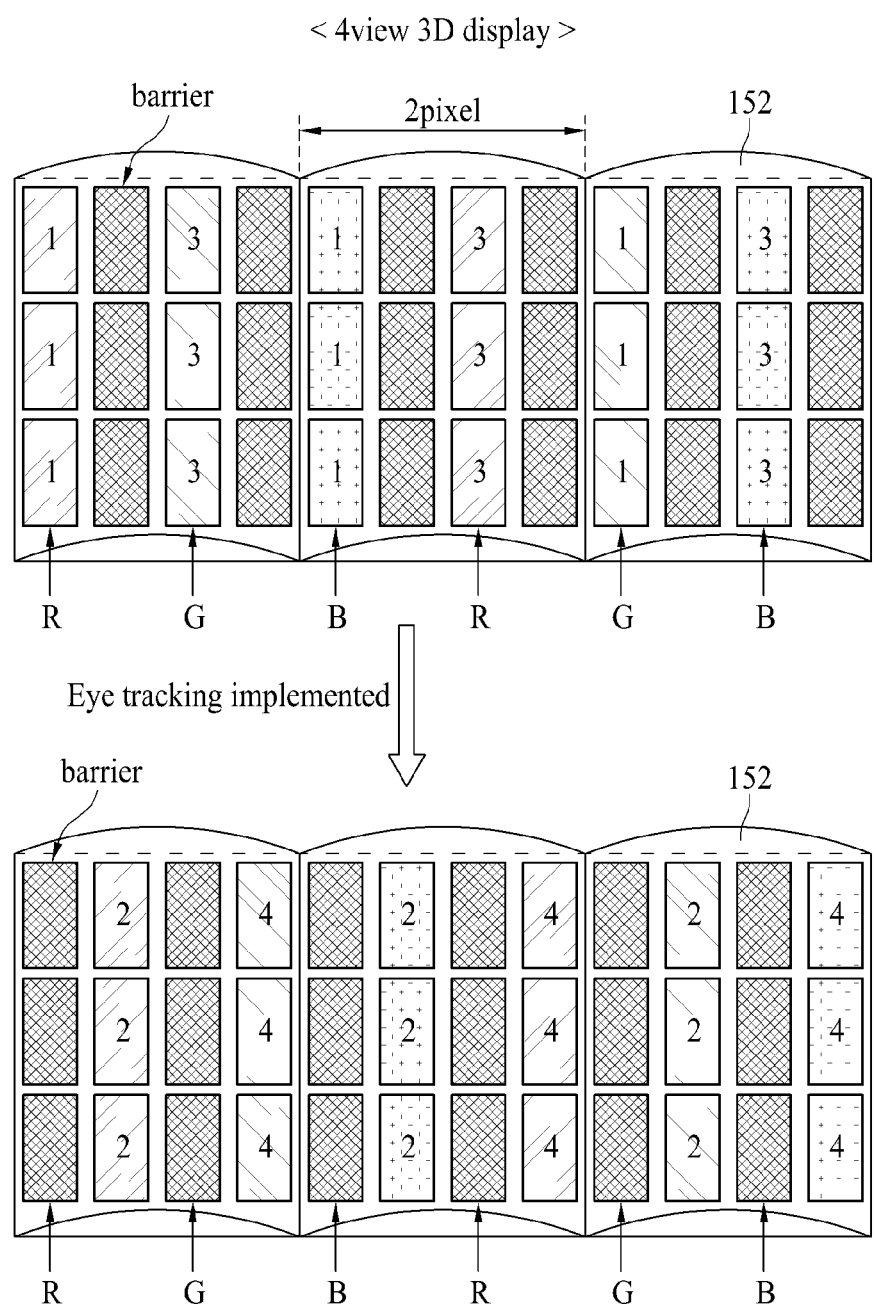
FIG. 11 is a diagram illustrating a driving method of a 4-view 3D mode and change of a viewing zone based on eye tracking.
Figure 12:
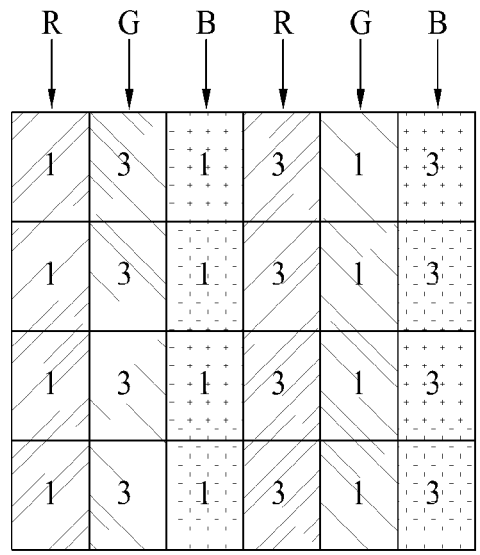
FIG. 12 is a diagram illustrating binocular cognitive images (left-eye image and right-eye image) and resolution during 4-view 3D mode driving of a stereopsis image display device according to the embodiment of the present invention.

FIG. 11 is a diagram illustrating a driving method of a 4-view 3D mode and change of a viewing zone based on eye tracking, and FIG. 12 is a diagram illustrating binocular cognitive images (left-eye image and right-eye image) and resolution during 4-view 3D mode driving of a stereopsis image display device according to the embodiment of the present invention.

With reference to FIGS. 11 and 12, a pixel structure is shown, in which pixels are arranged to allow a viewer to view 2D/3D images through 4 views. The glasses-free display device to which a lenticular film is applied may display images of high quality without 3D crosstalk when a viewer views 2D/3D images.

In a 3D mode, one of two domains is turned off while the other one is turned on. For example, the first domain formed at the left side of the two domains is turned on while the second domain formed at the right side of the two domains is turned off.

Since the turned-off domain displays a back image, the corresponding domain becomes a barrier. Since a half of the two domains is blacked, the viewer views all sub pixels. Accordingly, resolution of 2D image is equivalent to that of 3D image.

Left-eye image data or right-eye image data may be input to every odd numbered sub pixel based on a horizontal line, and the other data may be input every to even numbered sub pixel. For example, if left-eye image data are input to the respective odd numbered sub pixels, the right-eye image data are input to the respective even numbered sub pixels.

FIG. 12 is a diagram illustrating binocular cognitive images (left-eye image and right-eye image) and resolution during 4-view 3D mode driving of a stereopsis image display device according to the embodiment of the present invention.

With reference to FIG. 12, the left-eye image and the right-eye image displayed on the display panel are refracted through the lenticular film, thereby forming a viewing zone. The viewer perceives 3D image by respectively receiving images corresponding to the left eye and the right eye. If 2-view 3D image is displayed on the display panel, the viewer may perceive full resolution.

Figure 13:
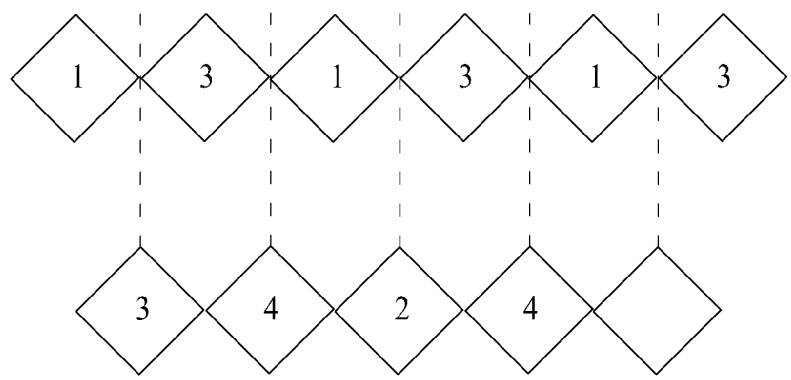
FIG. 13 is a diagram illustrating that a viewing zone is changed based on eye tracking in a 4-view 3D mode.

FIG. 13 is a diagram illustrating that a viewing zone is changed based on eye tracking in a 4-view 3D mode.

With reference to FIG. 13, in a 4-view 3D image mode, the position where black data are inserted on the display panel has been changed from the first domain to the second domain. Eye tracking may be performed by change from the second domain to the first domain.

In the present invention, image change occurs as much as ½ in comparison with the related art, thereby enabling natural tracking. In other words, in the present invention, 4-view based tracking may be performed in a 2-view based structure, whereby tracking throughput is improved as much as twice in comparison with the related art.

Figure 14:
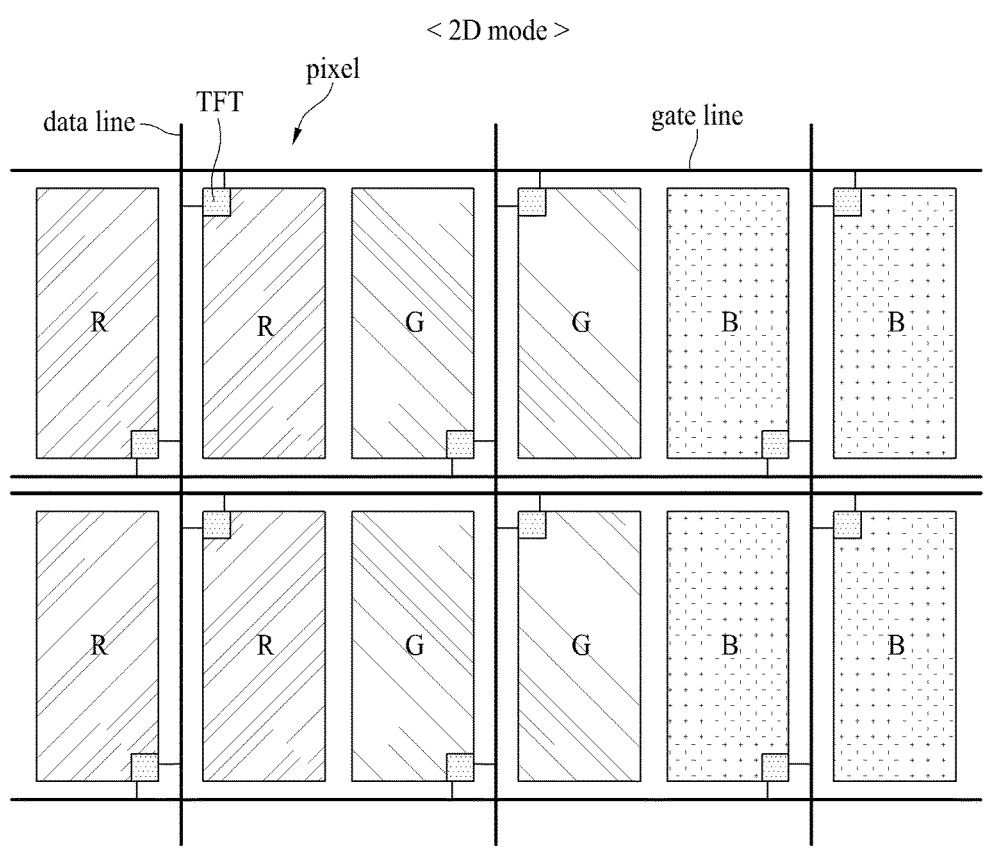
FIG. 14 is a diagram illustrating a pixel structure and a driving method of a 2D mode according to another embodiment of the present invention.
Figure 15:
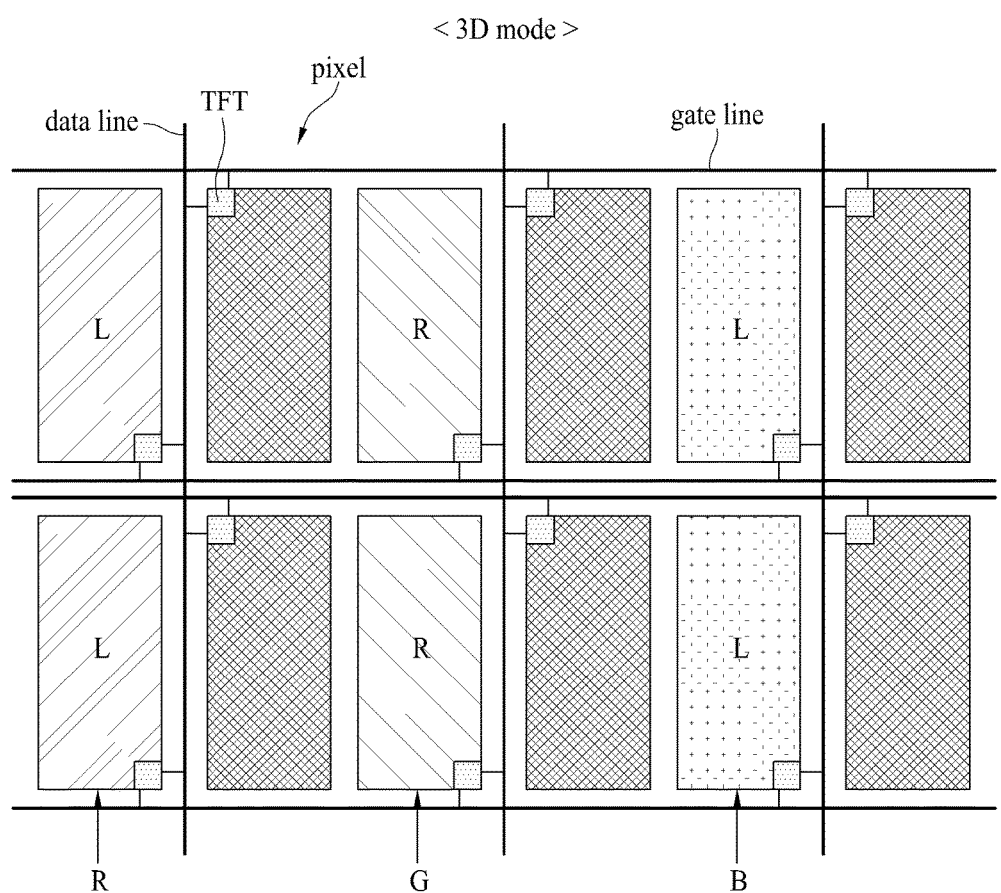
FIG. 15 is a diagram illustrating a pixel structure and a driving method of a 3D mode according to another embodiment of the present invention.

FIG. 14 is a diagram illustrating a pixel structure and a driving method of a 2D mode according to another embodiment of the present invention, and FIG. 15 is a diagram illustrating a pixel structure and a driving method of a 3D mode according to another embodiment of the present invention.

With reference to FIGS. 14 and 15, one pixel is formed in a two-domain structure, wherein the two domains share one data line. The two domains are connected to their respective gate lines different from each other, and TFT formed in each domain is driven independently.

In this case, in order to input data of the two domains to the common data line, basic frequency of the data line is formed based on a frame rate of 120 Hz. Basic frequency of the gate line may be formed based on a frame rate of 120 Hz, or may be 60 Hz if a double gate mode is used.

In a 2D mode, two domains are turned on in the same manner as the general display driving method, whereby images are displayed on the two domains. On the other hand, in a 3D mode, black data are supplied to one of the two domains, wherein the corresponding domain is located at a left or right side, whereby the corresponding domain is turned off and becomes a barrier.

FIG. 16 is a diagram illustrating input data for driving of a 2D mode and a 3D mode.

With reference to FIG. 16, signal timing is shown, which is based on a double gate structure that the gate driver is formed at the left and right sides of the display panel.

Since two domains are formed at one sub pixel, two gate timing signals are required for each sub pixel. In order that TFTs of the two domains are turned on individually and data are input, given time difference occurs.

In this case, respective GSP signals are formed in due order in accordance with time difference equivalent to 1 tclk, and gate signals different from those of the related art are formed based on the GSP signals.

Although basic signal timing occurs equally in the 2D mode and the 3D mode, a data input value of the 2D mode is different from that of the 3D mode. In the 3D mode, black data are input to one domain every 2 tclk. Afterwards, R, G and B image data are input every 2 tclk after 1 tclk from the time when the black data are input.

In other words, image data and black data are input alternately, whereby image data are input to one domain and black data are input to the other domain.

Also, in order to change the position of the viewing zone based on eye tracking, the domain to which black data are input and the domain to which image data are input are changed to each other.

Figure 17:
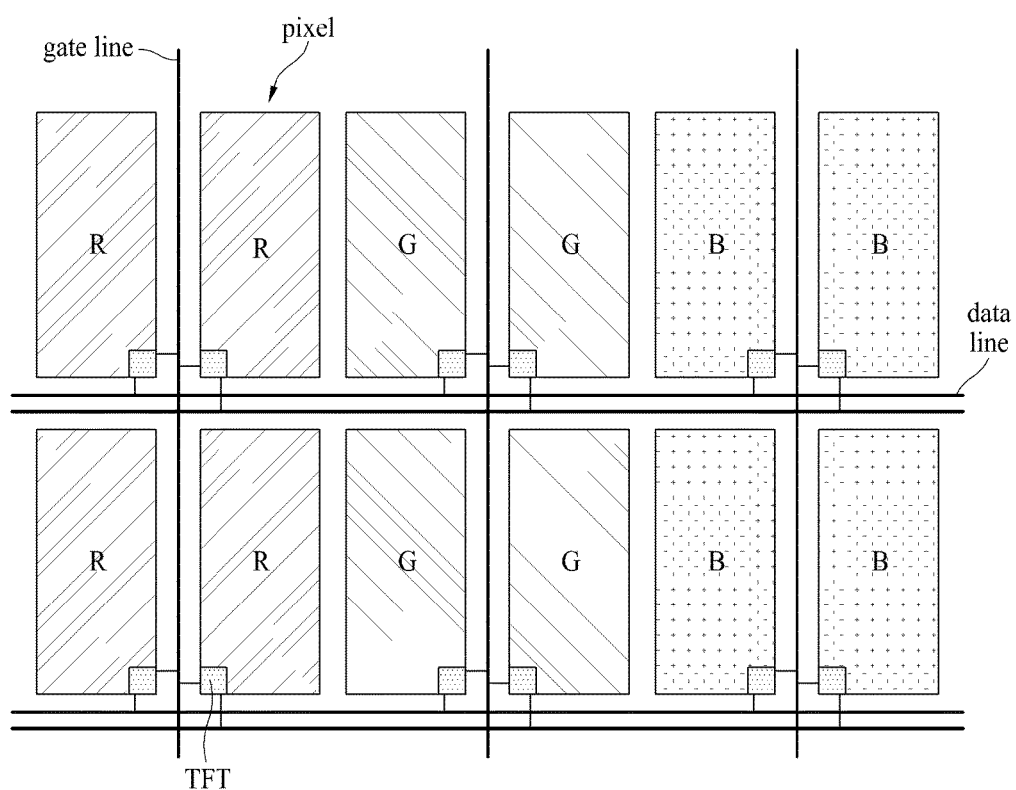
FIG. 17 is a diagram illustrating a pixel structure according to still another embodiment of the present invention.

FIG. 17 is a diagram illustrating a pixel structure according to still another embodiment of the present invention.

With reference to FIG. 17, the data line and the gate line are formed in the horizontal 2-domain pixel structure reversely to the pixel structure shown in FIG. 15.

In this pixel structure of FIG. 17, two domains share one gate line, and image data are supplied from the independent data line to the two domains.

If the pixel structure is changed as above, the number of lines of the display panel is reduced, whereby parasitic cap and an aperture ratio of the pixel may be increased. However, since frequency of the data line should be increased, this pixel structure is suitable for a small-scaled model.

Figure 18:
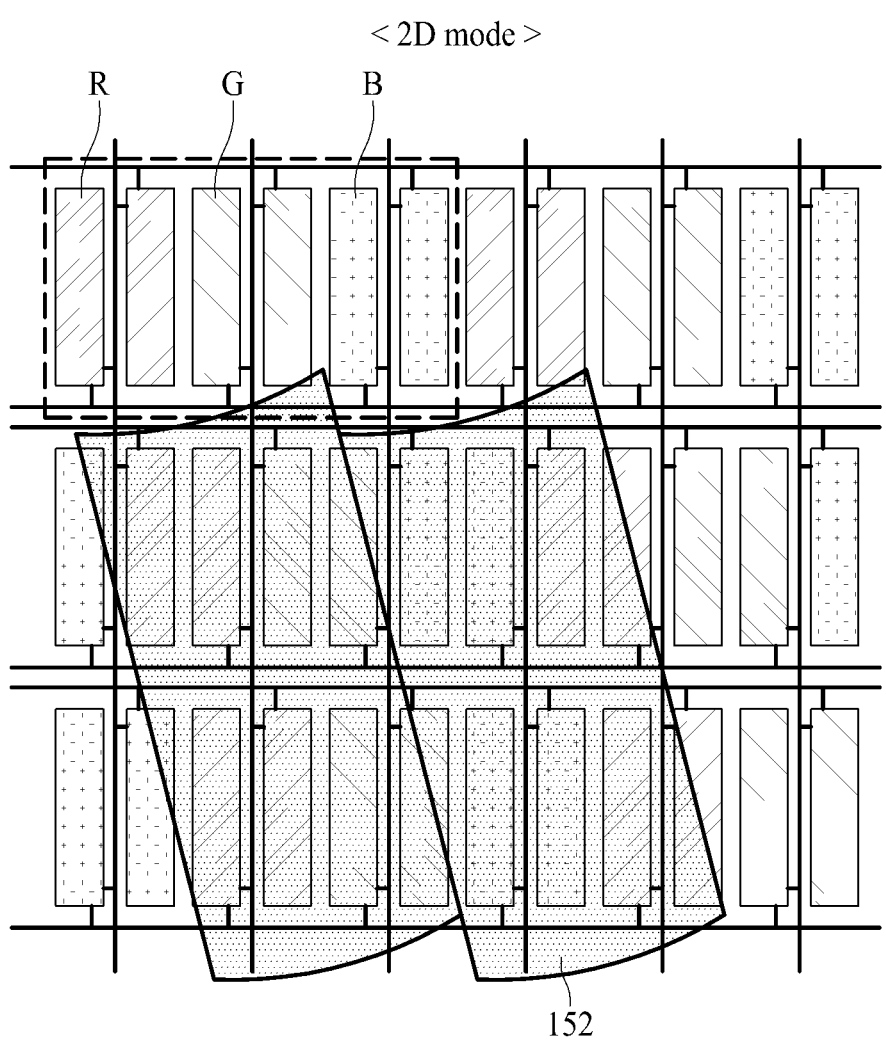
FIG. 18 is a diagram illustrating that a lens is arranged to be inclined and 2D image is displayed.
Figure 19:
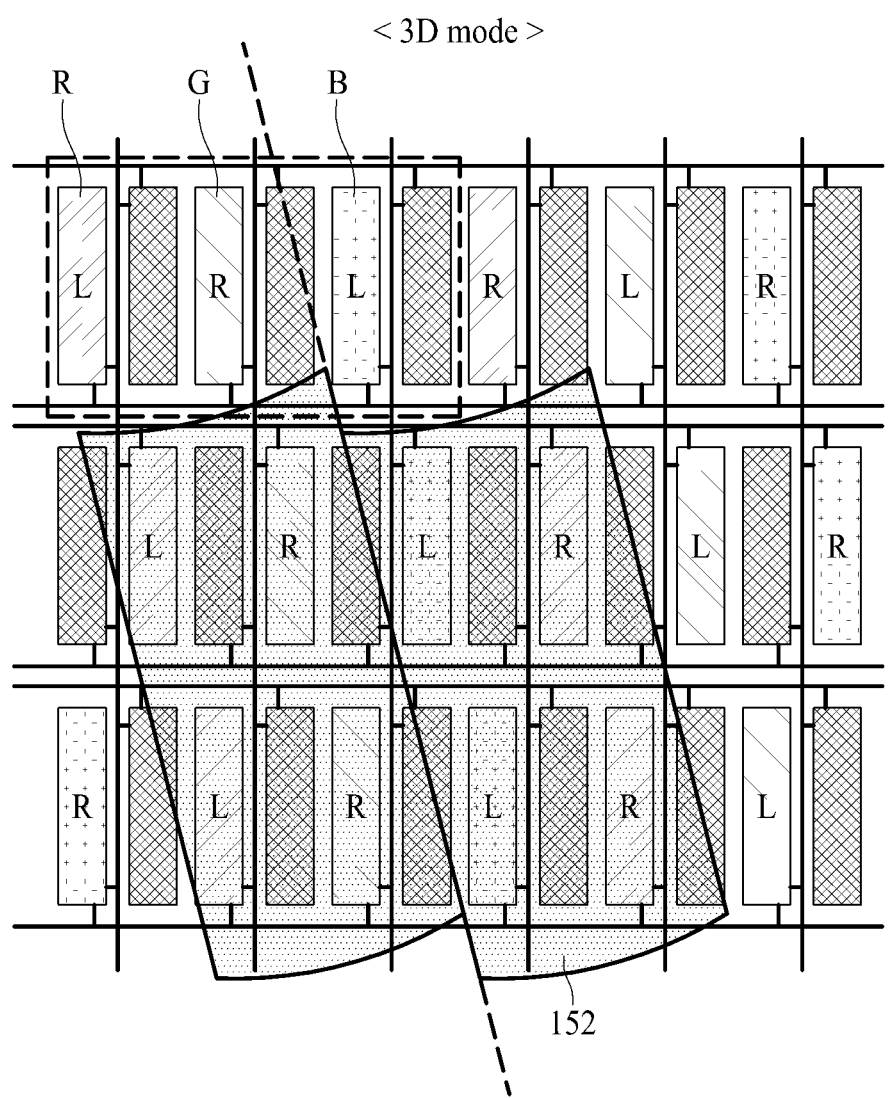
FIG. 19 is a diagram illustrating that a lens is arranged to be inclined and 3D image is displayed.

FIG. 18 is a diagram illustrating that a lens is arranged to be inclined and 2D image is displayed, and FIG. 19 is a diagram illustrating that a lens is arranged to be inclined and 3D image is displayed.

With reference to FIGS. 18 and 19, sub pixels are formed to have a horizontal 2-domain structure. The two domains share one data line, and are connected to the independent gate line, whereby TFT of each domain is driven individually.

The lenticular film is attached to the display panel at an inclined angle, and is provided with lenses 152 or 3D filter for inputting a left image and a right image to both eyes of the viewer.

In 3D mode driving, one of the two domains displays the left-eye image or the right-eye image, and the other domain becomes a barrier by displaying black image.

As a result, the left-eye image and the right-eye image may be output to one line without reducing resolution, and the portion where the black image is displayed serves as a barrier and a polarizing film, whereby the existing barrier layer and polarizing film may be omitted.

The lenses 152 are formed on the pixel at a specific inclined angle, and split a sub pixel of the left-eye image and a sub pixel of the right-eye image from each other on the basis of the display portion of the black image, whereby 3D crosstalk may be removed fundamentally. Also, a defect factor caused by bending of the lenticular film may be removed.

Although the structures of the pixel and lenses 152 shown in FIGS. 18 and 19 are advantageous in view of the manufacturing process, R, G and B sub pixels are inclined, whereby the structures may be unfavorable for readability of 2D and 3D text.

Figure 20:
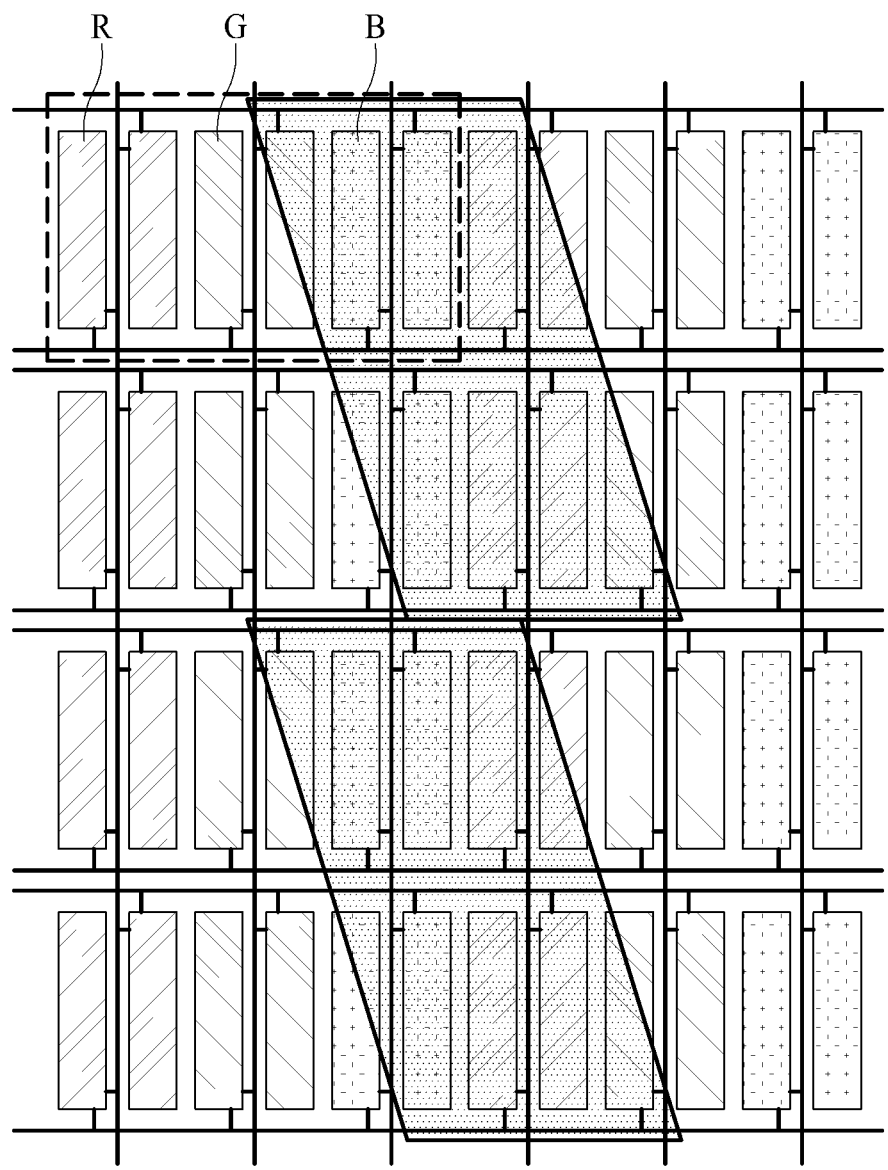
FIG. 20 is a diagram illustrating that a lens is arranged to be inclined in accordance with another embodiment.
Figure 21:
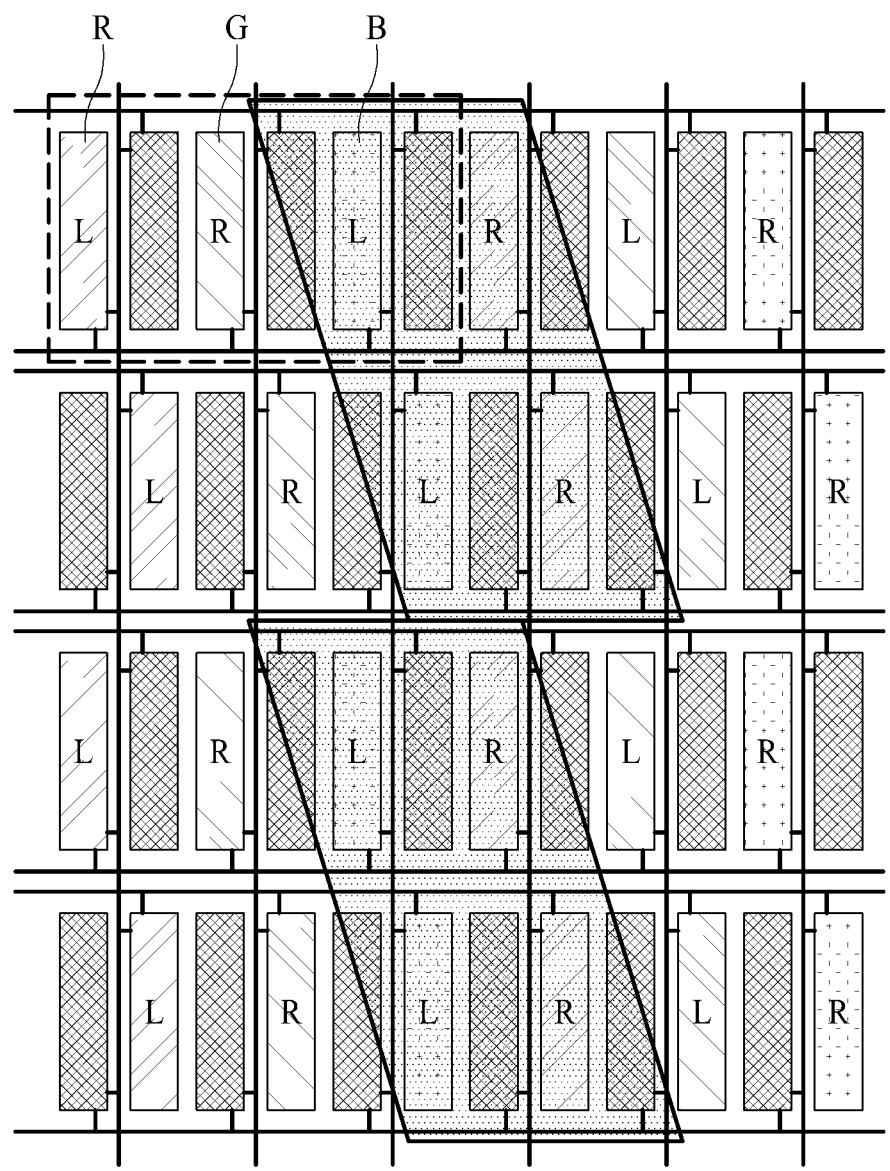
FIG. 21 is a diagram illustrating that a lens is arranged to be inclined in accordance with other embodiment.

FIGS. 20 and 21 are diagrams illustrating that a lens is arranged to be inclined in accordance with another embodiments.

With reference to FIGS. 20 and 21, pixels are arranged such that sub pixels have a vertical 2-domain structure. The two domains share one data line, and the two domains are driven independently by different gate lines.

Lenses 152 for inputting the left-eye image and the right-eye image of the display panel to both eyes of the viewer are arranged at an inclined angle. In this case, the lenses 152 are formed repeatedly at the same position every vertical two lines or every multiple of 2.

As described above, as the inclined lenticular film is configured such that the lenses 152 are repeatedly formed at the same position every vertical two lines or every multiple of 2, R, G and B sub pixels may be formed vertically in the same manner as the existing display panel.

Accordingly, the problem that readability of 2D and 3D text is reduced may be solved. Since the lenses are formed with a specific inclined angle and split the sub pixel of the left-eye image and the sub pixel of the right-eye image from each other on the basis of the display portion of the black image, 3D crosstalk is not generated.

The stereopsis image display device and the method for driving the same according the embodiment of the present invention prevents 3D crosstalk from being generated and enables the lenticular film to be bent freely.

Also, the stereopsis image display device and the method for driving the same according the embodiment of the present invention may reduce the manufacturing cost and thickness by omitting the gap glass or gap film used at a proper viewing distance of 3D images.

Also, the stereopsis image display device and the method for driving the same according to the embodiment of the present invention may display 3D images of high quality and increase luminance of 3D images.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A stereopsis image display device having a 2D mode and a 3D mode, comprising:
    a plurality of data lines extending in a first direction on a substrate of a display panel;
    a plurality of gate lines extending in a second direction on the substrate;
    a plurality of pixels disposed in the display panel at crossings between the plurality of gate lines and the plurality of data lines, the pixels including a left-eye red (R) pixel, a right-eye green (G) pixel, a left-eye blue (B) pixel, a right-eye red (R) pixel, a left-eye green (G) pixel, and a right-eye blue (B) pixel arranged adjacent one another in the second direction, and each of the left-eye R pixel, the right-eye G pixel, the left-eye B pixel, the right-eye R pixel, the left-eye G pixel, and the right-eye B pixel including:
        a first domain having a sub pixel, and
        a second domain adjacent to the first domain in the second direction and having another sub pixel; and
    a lenticular film provided on the display panel and having a plurality of lenses,
    wherein, for each of the left-eye R pixel, the right-eye G pixel, the left-eye B pixel, the right-eye R pixel, the left-eye G pixel, and the right-eye B pixel:
        in the 2D mode, the first domain is configured to receive respective left-eye R, right-eye G, left-eye B, right-eye R, left-eye G, or right-eye B image data in a first clock cycle, and the second domain is configured to receive the same respective left-eye R, right-eye G, left-eye B, right-eye R, left-eye G, or right-eye B image data in a second clock cycle following the first clock cycle, and
        in the 3D mode, one of the first domain and the second domain is configured to receive the respective left-eye R, right-eye G, left-eye B, right-eye R, left-eye G, or right-eye B image data in one of the first and second clock cycles, and the other of the first domain and the second domain is configured to receive black data to display black in the other of the first and second clock cycles.

2. The stereopsis image display device of claim 1, wherein, for each of the left-eye R, right-eye G, left-eye B, right-eye R, left-eye G, and right-eye B pixels:
    in the 3D mode, the other of the first domain and the second domain is configured to serve as a barrier by displaying black while the one of the first domain and the second domain is configured to display images corresponding to the respective left-eye R, right-eye G, left-eye B, right-eye R, left-eye G, or right-eye B image data.

3. The stereopsis image display device of claim 2, wherein the first domain and the second domain of each of the left-eye R, right-eye G, left-eye B, right-eye R, left-eye G, and right-eye B pixels are each configured to alternate between displaying black and displaying the images from one clock cycle to next clock cycle to implement eye tracking at an interval of ½ view.

4. The stereopsis image display device of claim 1, wherein each of the lenses overlaps a plurality of sub pixels in the second direction in a plan view,
    wherein the lenses of the lenticular film extend in a vertical direction, and
    wherein the second direction is a horizontal direction, and the first direction is the vertical direction.

5. The stereopsis image display device of claim 1, wherein each of the lenses overlaps a plurality of sub pixels in the second direction in a plan view, and
    wherein the lenses of the lenticular film extend in a third direction slanted from the first direction and from the second direction in plan view.

6. The stereopsis image display device of claim 1, wherein the display panel is configured to display images perceived at a same resolution in the 3D mode as in the 2D mode.

7. The stereopsis image display device of claim 1, wherein the sub pixel of the first domain and the sub pixel of the second domain are connected to a same one of the data lines, and are connected respectively to two different gate lines.

8. The stereopsis image display device of claim 1, further comprising:
    a polarizing film on the display panel; and
    a gap film on the polarizing film,
    wherein the lenticular film is disposed directly on the gap film.

9. A method for driving a stereopsis image display device having a 2D mode and a 3D mode, and comprising a plurality of data lines extending in a first direction, a plurality of gate lines extending in a second direction, and a plurality of pixels disposed at crossings between the data lines and the gate lines, the pixels including a left-eye red (R) pixel, a right-eye green (G) pixel, a left-eye blue (B) pixel, a right-eye red (R) pixel, a left-eye green (G) pixel, and a right-eye blue (B) pixel arranged adjacent one another in the second direction, and each of the left-eye R pixel, right-eye G pixel, the left-eye B pixel, the right-eye R pixel, the left-eye G pixel, and the right-eye B pixel including a first domain having a sub pixel and a second domain adjacent to the first domain in the second direction and having another sub pixel, the method comprising:
    inputting left-eye R, right-eye G, left-eye B, right-eye R, left-eye G, and right-eye B image data to the first domain of the left-eye R, right-eye G, left-eye B, right-eye R, left-eye G, and right-eye B pixels, respectively, in a first clock cycle to display an image corresponding to the left-eye R, right-eye G, left-eye B, right-eye R, left-eye G, or right-eye B image data;
    in the 3D mode, inputting black data to the second domain of each of the left-eye R, right-eye G, left-eye B, right-eye R, left-eye G, and right-eye B pixels in a second clock cycle directly following the first clock cycle for the second domain to display black and serve as a barrier; and
    in the 2D mode, inputting the same left-eye R, right-eye G, left-eye B, right-eye R, left-eye G, and right-eye B image data to the second domain of the left-eye R, right-eye G, left-eye B, right-eye R, left-eye G, and right-eye B pixels, respectively, in the second clock cycle.

10. The method of claim 9, wherein the first domain and the second domain of one of the left-eye R, right-eye G, left-eye B, right-eye R, left-eye G, and right-eye B pixels are connected to a same one of the data lines, and are connected respectively to two different gate lines.

11. The method of claim 9, further comprising:
in the 3D mode, inputting the black data to the first domain of the left-eye R, right-eye G, left-eye B, right-eye R, left-eye G, and right-eye B pixels in a third clock cycle following the second clock cycle for the first domain to display black and serve as a barrier; and
inputting the left-eye R, right-eye G, left-eye B, right-eye R, left-eye G, and right-eye B image data to the second domain of the left-eye R, right-eye G, left-eye B, right-eye R, left-eye G, and right-eye B pixels, respectively, in a fourth clock cycle directly following the third clock cycle to display an image corresponding to the left-eye R, right-eye G, left-eye B, right-eye R, left-eye G, and right-eye B data, whereby eye tracking is implemented at an interval of ½ view.

12. The method of claim 9, further comprising displaying images perceived at a same resolution in the 3D mode as in the 2D mode.

13. A stereopsis image display device having a 2D mode and a 3D mode, the stereopsis image display device comprising:
a plurality of data lines extending in a first direction on a substrate of a display panel;
a plurality of gate lines extending in a second direction on the substrate;
a plurality of pixels disposed in the display panel at crossings between the plurality of gate lines and the plurality of data lines, the pixels including a left-eye red (R) pixel, a right-eye green (G) pixel, a left-eye blue (B) pixel, a right-eye red (R) pixel, a left-eye green (G) pixel, and a right-eye blue (B) pixel arranged adjacent one another in the second direction, and each of the left-eye R pixel, the right-eye G pixel, the left-eye B pixel, the right-eye R pixel, the left-eye G pixel, and the right-eye B pixel including:
a first domain having a sub pixel, and
a second domain adjacent to the first domain in a horizontal direction and having another sub pixel; and
a lenticular film provided on the display panel and having a plurality of lenses, each lens overlapping a plurality of sub pixels in the horizontal direction in a plan view,
wherein, in the 3D mode, one of the first domain and the second domain of each of the left-eye R, right-eye G, left-eye B, right-eye R, left-eye G, and right-eye B pixels is configured to serve as a barrier by displaying black while the other of the first domain and the second domain of the left-eye R, right-eye G, left-eye B, right-eye R, left-eye G, and right-eye B pixels is configured to display an image corresponding to respective left-eye R, right-eye G, left-eye B, right-eye R, left-eye G, and right-eye B image data, and
wherein the display panel is configured to display images perceived at a same resolution in the 3D mode as in the 2D mode.

14. The stereopsis image display device of claim 13, wherein, for each of the left-eye R, right-eye G, left-eye B, right-eye R, left-eye G, and right-eye B pixels:
in the 2D mode, the display device is configured to input same left-eye R, right-eye G, left-eye B, right-eye R, left-eye G, or right-eye B image data to both the first domain and the second domain, and
in the 3D mode, the display device is configured to input the left-eye R, right-eye G, left-eye B, right-eye R, left-eye G, or right-eye B image data to the first domain to display an image corresponding to the left-eye R, right-eye G, left-eye B, right-eye R, left-eye G, or right-eye B image data, and to input black data to the second domain sub pixel to display black.

15. The stereopsis image display device of claim 13, wherein:
the first domain and the second domain of each of the left-eye R, right-eye G, left-eye B, right-eye R, left-eye G, and right-eye B pixels are each configured to alternate between displaying black and displaying the image from one clock cycle to a next clock cycle.

16. The stereopsis image display device of claim 13, wherein each of the lenses overlaps at least four sub pixels in the horizontal direction and extends in a vertical direction, and
wherein one of the first direction and the second direction is the horizontal direction, and the other of the first direction and the second direction is the vertical direction.

17. The stereopsis image display device of claim 13, wherein each of the lenses extends in a third direction slanted from the first direction and from the second direction in plan view.

18. The stereopsis image display device of claim 13, further comprising:
a polarizing film on the display panel; and
a gap film on the polarizing film,
wherein the lenticular film is disposed directly on the gap film.

19. The stereopsis image display device of claim 13, wherein the first domain and the second domain are connected to a same one of the data lines, and are connected respectively to two different gate lines.

20. The stereopsis image display device of claim 13, in the 2D mode, the first domain of each of the left-eye R, right-eye G, left-eye B, right-eye R, left-eye G, and right-eye B pixels is configured to receive corresponding left-eye R, right-eye G, left-eye B, right-eye R, left-eye G, or right-eye B image data in a first clock cycle, and the second domain of each of the left-eye R, right-eye G, left-eye B, right-eye R, left-eye G, and right-eye B pixels is configured to receive the same corresponding left-eye R, right-eye G, left-eye B, right-eye R, left-eye G, or right-eye B image data in a second clock cycle following the first clock cycle.

* * * * *